Sept. 1, 1964 T. C. McGOW ETAL 3,146,875
MECHANICAL SELECTION DEVICE FOR CONVEYORS
Filed Nov. 20, 1961 4 Sheets-Sheet 1

INVENTORS
THOMAS C. McGOW
DONALD A. SCHNEIDER
BY ROBERT W. GOTHAM

ATTORNEYS

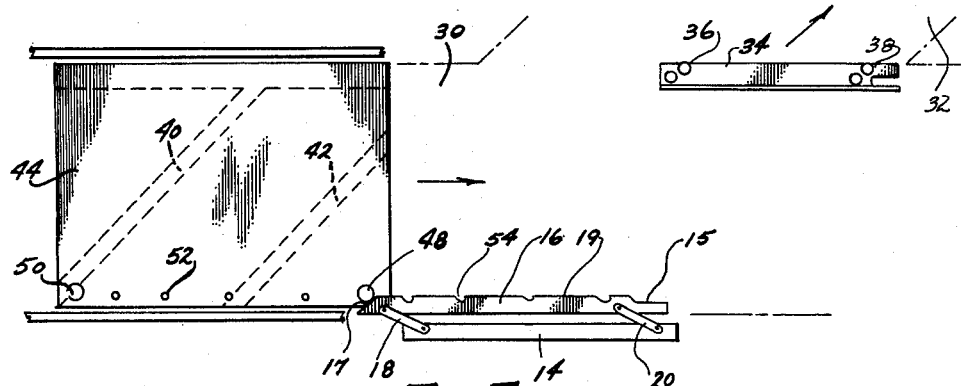
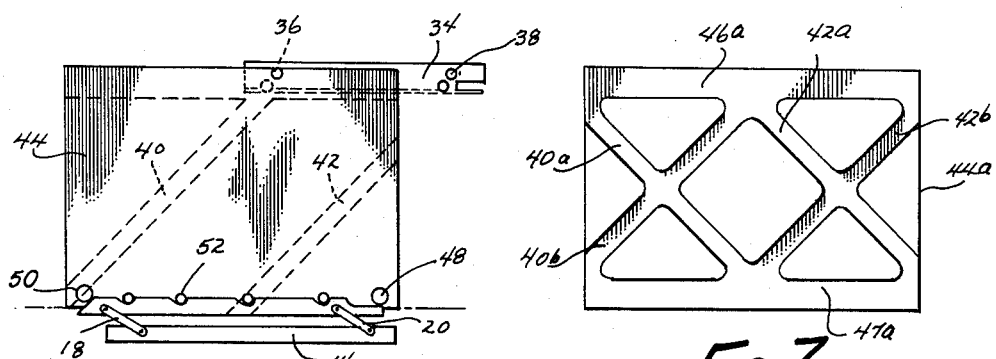
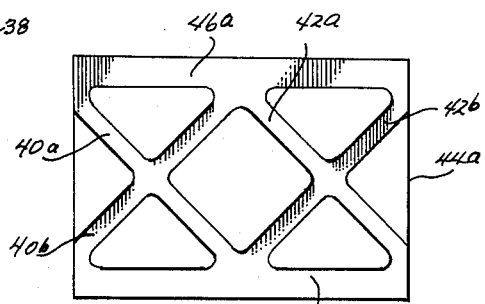
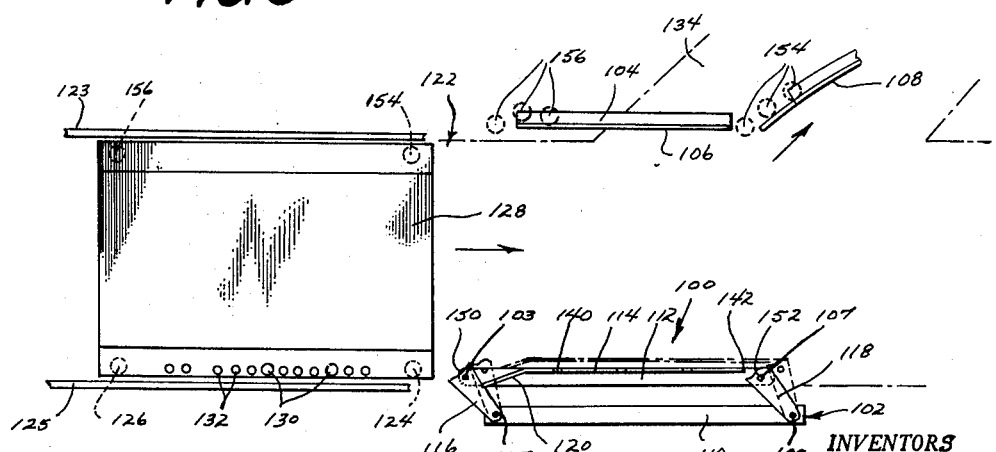

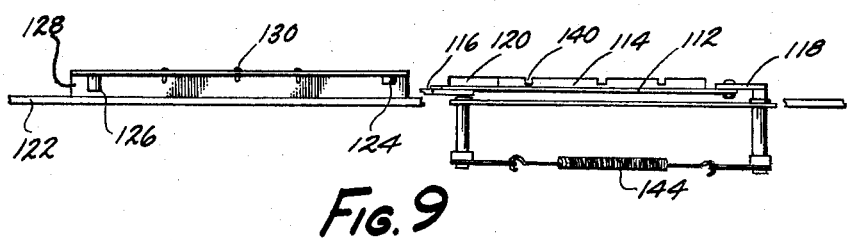
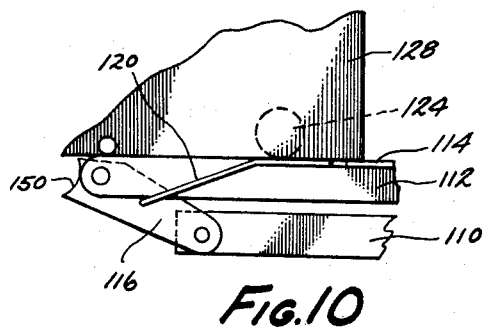
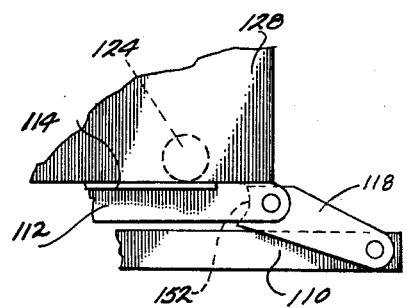
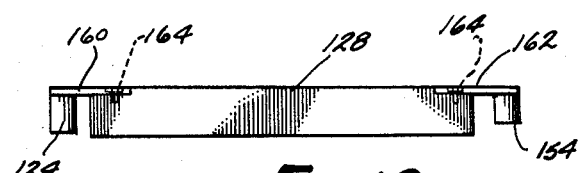
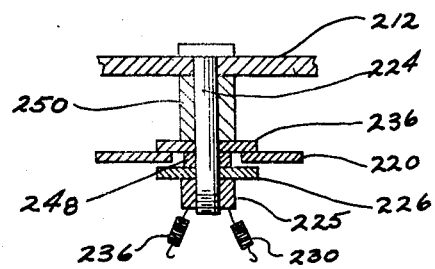

Sept. 1, 1964     T. C. McGOW ETAL     3,146,875
MECHANICAL SELECTION DEVICE FOR CONVEYORS
Filed Nov. 20, 1961     4 Sheets-Sheet 4

INVENTORS
THOMAS C. McGOW
DONALD A. SCHNEIDER
BY ROBERT W. GOTHAM

ATTORNEYS

United States Patent Office 3,146,875
Patented Sept. 1, 1964

3,146,875
MECHANICAL SELECTION DEVICE FOR
CONVEYORS
Thomas C. McGow, Summit, N.J., Donald A. Schneider,
Ada Township, Kent County, Mich., and Robert W.
Gotham, Plainfield, N.J., assignors to The Rapids-Standard Company, Inc., Grand Rapids, Mich., a corporation
of Michigan
Filed Nov. 20, 1961, Ser. No. 153,570
2 Claims. (Cl. 198—38)

This invention relates to conveyors, and more particularly to a mechanism for reading pre-set codes on passing carriers and causing a reaction to occur with respect to a particular carrier selected from the other carriers, to divert the carrier from the conveyor on which it is traveling.

This is a co-pending application of application Serial No. 100,085, filed April 3, 1961, entitled Mechanical Selection for Conveyors, and assigned to the assignee herein.

Preselection and carrier diverting mechanisms of the prior art range from the very simple to the very complex. The simple devices characteristically effect only elementary selection operations, and further are adaptable only to certain types of conveyors. Their use is thus quite limited. In high speed manufacturing, automated warehousing, and other industrial and commercial applications where elaborate conveying and routing systems are so important, highly complex selection and diverting mechanisms necessarily have been adopted. These may involve a reader having a series of independently reciprocable pins which, when properly actuated, close a series of electrical switches to activate an independent diverting electrical solenoid system; or may involve a carefully arranged and delicate magnetic coding and reading apparatus to actuate an electrical control network for a diverter; or may involve a linked set of tripping arms, stopping levers, and frictional clutching devices; or may involve any number of other complex apparatuses on the market today.

Users of automated conveyor systems therefore must either purchase elaborate, expensive, and complicated preselection and diverting mechanisms, or must supplement the simple and functionally limited type with manual labor due to the present lack of a preselection mechanism which possesses in combination the several attributes of (1) simplicity, (2) reliability, (3) operational versatility for adaptation to different types of conveyed articles, and/or different types of conveyors including both powered and gravity types, and both overhead and floor types, and (4) flexibility of attachment to allow quick, simple relocation of a combined selector and diverter on the conveyor.

A need has existed in this art for a basic conveyor selection and diverter mechanism which could compatibly combine all of these features. This need has become urgent in recent years due to the greatly increased automation in manufacturing, warehousing, and other industries where the resulting complex, conveyor-traffic-control systems must be flexible and capable of quick performance, but must approach the ultimate in simplicity to reduce initial investment and subsequent maintenance, failure and modifications costs.

In the prior art devices, not only are the preselection and diverter mechanisms limited and usually complex and expensive, but also the selector generally acts only as a trip for a separate set of stopping and tripping devices and clutching mechanisms, or a separate and independently powered diverting mechanism such as an electrical solenoid or the like. To provide auxiliary power equipment is usually undesirable due to increased cost, space consumption, maintenance, and down-time failures, among others. Further, the use of delicate mechanical tripping arms and clutches is not satisfactory for heavier carriers, or under adverse working conditions. In addition, it is not desirable to bring moving carriers having substantial weight to a stop before rerouting as is necessary with some prior art mechanisms.

In many instances, it has become highly desirable to eliminate the necessity for an independently powered diverter for economic and space saving reasons, among others. This conceivably could be accomplished by using the momentum of the passing carrier, or alternatively the energy of the powered member of the conveyor with the passing carrier as an intermediate energy transferring means. Heretofore, no simple, effective, and versatile device capable of combining the reading and the diverting functions into one device has been devised. The diverting device should be able to receive energy directly from the passing carrier, and then gradually and continuously divert the carrier from the conveyor by using the harnessed energy.

The code means utilized on such a device should also be easily and quickly variable and have a large number of possible code combinations. This is especially true where the device is to replace presently used electrical switching and magnetic coding systems.

It is therefore the object of this invention, among others, to provide a mechanical selection and diverting device for conveyors which possesses all of the above desirable characteristics. It provides such a device which is both simple and inexpensive. It is interchangeably adaptable to a wide range of conveyors, both powered and gravity, and both floor type and overhead. It is capable of using the energy of the passing article carriers to select the carrier and then effect its diversion from the carrier. It is capable of causing the carrier to be removed from the conveyor without auxiliary power equipment. It uses no delicate tripping levers, stopping mechanisms, or troublesome auxiliary clutching members. It smoothly and effectively diverts the passing carrier without stopping it or substantially reducing its speed. It simplifies diverter construction to a marked degree and costs only a fraction of that of conventional devices.

The objects of this invention also include a structure of compact construction capable of rapid and simple relocation along the conveyor. It provides a self-contained or packaged unit requiring little or no reworking of the conveyor for installation or removal. Despite the simplicity and the reduction in cost, this invention provides a selection system capable of a wide range of code variations. The code is capable of quick and simple resetting.

These and many other objects will be apparent to those in the art upon studying the following specification in conjunction with the drawings, in which:

FIG. 5 is a plan view of the apparatus as illustrated in FIG. 1 with a passing carrier shown in solid lines as it initially depresses the selector member;

FIG. 6 is a plan view of the selection and diverting apparatus illustrated in FIG. 1 forming an interengagement with a selected carrier;

FIG. 7 is a bottom view of a slightly modified and two position carrier usable with the apparatus illustrated in FIG. 1;

FIG. 8 is a plan view illustrating a slightly modified diverting device and an approaching carrier on the conveyor;

FIG. 9 is a side elevational view of the apparatus illustrated in FIG. 8;

FIG. 10 is an enlarged fragmentary plan view of the selector apparatus illustrated in FIG. 8 as depressed by a passing carrier;

FIG. 11 is an enlarged fragmentary plan view of the selector apparatus illustrated in FIG. 8 just prior to the reading function;

FIG. 12 is an end view of the carrier illustrated in FIG. 8;

FIG. 15 is an enlarged fragmentary sectionary elevational view of the apparatus in FIG. 14.

Basically, the invention comprises a selection and diverting apparatus for carriers on conveyors. The pre-set message code elements of each passing carrier associate with code reading means on the mechanical selection member of the apparatus, and upon the formation of a key-combination or interengagement between the pre-set code of a particular carrier and the selection member, a reaction occurs in the selection apparatus causing it to shaft laterally and divert the carrier. The interengagement between the carriers and the selection apparatus preferably effects a motion transmitting joint therebetween to transmit energy from the passing carrier to the selection and diverting apparatus, which in turn reacts upon the carrier to divert it.

The selector member preferably constitutes one leg of a pantograph-resembling, four-bar linkage with four legs arranged in a parallelogram. Alternatively, it may be movably mounted upon a fixed slotted base or the like. The reading and selection operation is by association of spaced orifices or slots with spaced projections. The slots are blind and are located on the selector to interlock with complementary pins on a particular passing carrier to form the motion transmitting joint. An auxiliary lead-off guide may be used to supplement the diverting selector apparatus.

Figure 1:
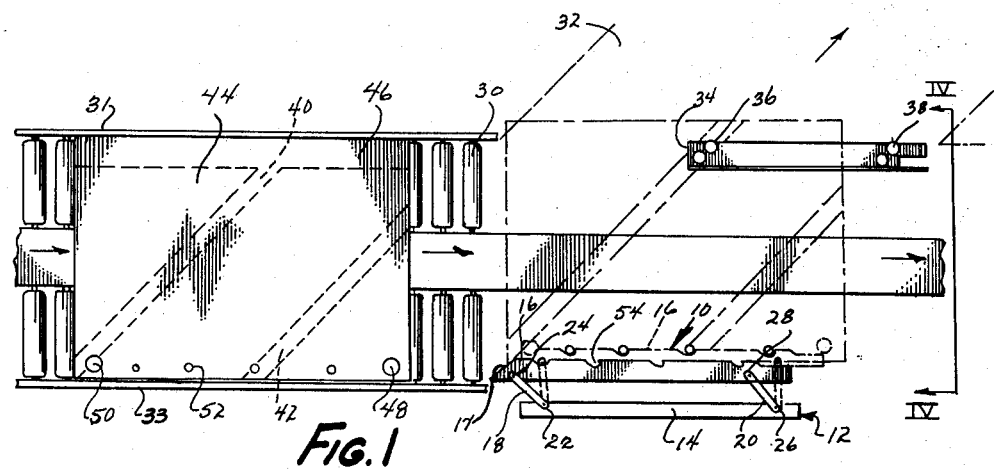
FIG. 1 is a plan view of one form of the novel selection and diverting mechanism on a conveyor and transporting a carrier.

Referring now to FIG. 1, in the form of the invention illustrated, the selection and diverting device 10 comprises a linkage 12 including a fixed leg 14, a second leg parallel to this fixed leg and comprising a reader bar or member 16, and two parallel intermediate legs 18 and 20 connecting fixed leg 14 with reader member 16 on pivotal connections 22, 24, 26 and 28. This structure is mounted to or adjacent conveyor 30 across from a receiving station or branch conveyor 32 to select particular carriers from conveyor 30 and divert them to the receiving station or branch conveyor 32. It is to be understood that the branch conveyor 32 may alternatively be a work table, a storage shelf, or any other suitable means for receiving the carriers. Further, although conveyor 30 is shown to include a belt 35, roller 37, and wheels 39, this is merely illustrative. An auxiliary lead-off guide 34 is mounted opposite and slightly longitudinally displaced from reader member 16 to supplement the diverting function of the selector. Sets of diagonal wheels 36 and 38 are positioned in alignment with branch conveyor 32 to coact with slots 40 and 42 in the lower surface of carrier 44.

A suitable set of guide rails 31 and 33 along the conveyor on the approach side of the selection and diversion mechanism assure alignment between the selector member and the code and camming pins on the carrier.

A longitudinal slot 46 in the lower surface of carriers 44 allows them to pass over wheels 36 and 38 all along the conveyor where no diverting action is to take place.

Extending upwardly from carrier 44 are a fixed lead camming pin 48 and a fixed follower camming pin 50, in addition to a plurality of settable message code pins 52 which associate with a plurality of blind slots 54 in reader 16. The slots comprise the main part of the reading means on the selector.

Figure 2:
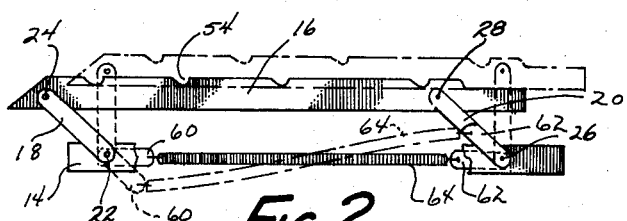
FIG. 2 is an enlarged plan view of the selection and diverting mechanism.
Figure 3:
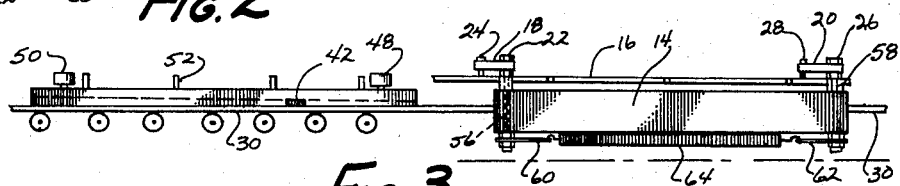
FIG. 3 is an elevational view of the apparatus in FIG. 1.
Figure 4:
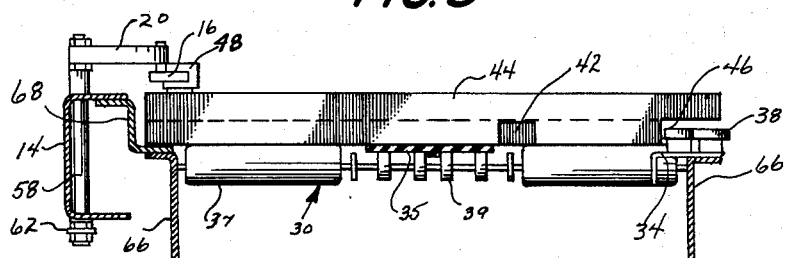
FIG. 4 is a sectional elevational view taken on plane IV—IV of FIG. 1.

Legs or links 18 and 20 are mounted above reader bar 16 (FIG. 3) with pivotal connections 22 and 26 being made by suitable bolts 56 and 58 extending through fixed leg 14. On the lower ends of bolts 56 and 58 are affixed a pair of facing spring supports 60 and 62 between which coil spring 64 is secured. Supports 60 and 62 normally extend directly toward each other to hold the parallelogram linkage in the position depicted in FIG. 1. Rotation of shafts 56 and 58 in either direction causes rotation of the supports and thus extension of spring 64 (as shown in phantom in FIG. 2) so that the spring tends to return the apparatus to its equilibrium position. Leg 14 is suitably secured to a stationary brace member 66 on the conveyor through a connector 68 (FIG. 4). Likewise, auxiliary deflector 34 is mounted to stationary brace member 68 on the opposite side of conveyor 30.

The individual carriers may be formed with uni-directional, parallel slots 40 and 42 or alternatively may be formed with bi-directional, parallel slots 40a and 42a in one direction, and 40b and 42b in a second direction as shown on carrier 44a in FIG. 7. Two longitudinal slots 46a and 47a are formed at the side edges in the under surface of the carrier possessing bi-directional slots to enable the carrier to interact with right-hand and left-hand diverters 10 on alternate sides of the conveyor to shift the pallets 44a in either direction.

*Operation of Apparatus*

When it is desired to transport a series of article carriers 44 down a conveyor 30, and to selectively divert these carriers onto branch conveyors, work station tables, and the like, each carrier is placed on the conveyor so that slots 40, 42 and 46 correspond with a suitable auxiliary diverter 34. Fixed camming pins 48 and 50 thus will cooperate successively with reader members 16 mounted along the main conveyor. A plurality of code pins 52 are inserted at spaced intervals on each carrier to correspond with slots 54 of a particular selector and diverter member 16 corresponding to the branch conveyor where the carrier is to be diverted. As the code bearing carrier approaches member 16 (held in equilibrium position by spring 64), leading cam pin 48 contacts cam surface 17 to depress the selector member and its connecting links toward fixed leg 14 and away from the conveyor (FIG. 5). Lead pin 48 then rides along front surface 19 of reader 16 until it reaches recess portion 15. Since it is considerably larger than slots 54, it rides smoothly over them. Upon reaching recess 15 biasing spring 64 causes reader 16 to be shifted toward the carrier 44 a small amount to cause code pins 52 to associate with reading slots 54 for a short interval of time. If the pins do not match the slots, no reaction occurs between the carrier and the reader 16. As the carrier continues to move, follower pin 50 then contacts cam surface 17 to again depress member 16 away from pins 52 so that the reading function ceases. This follower assures that only one reading per carrier will occur by each selector. It prevents the individual pins from catching and jamming in successive slots as they pass along the reader after the reading operation has taken place.

If the spaced code pins and reading slots are complementary, biasing spring 64 causes the reader member to swing laterally toward the conveyor and longitudinally with respect thereto to cause an interengagement between the pins and slots as depicted in FIG. 6. This interengagement or interlocking effectuates a motion transmitting joint between the selector and the carrier to transmit energy from the carrier to the selector and shift the selector longitudinally. The longitudinal motion is accompanied by lateral motion in the selector (as in phantom in FIG. 1) due to its linkage mounting. The lateral motion in turn causes a reaction upon the carrier, shifting it laterally across the conveyor. The diagonal shifting of the carrier by the selector-diverter device causes the auxiliary guide wheels 36 and 38 to catch in slots 40 and 42 on the carrier to lead it onto branch conveyor 32. It is to be understood that "diverting" by the selector device includes partial diversion by lateral shifting of the carrier followed by complete removal from the conveyor by auxiliary devices placed substantially downstream on the conveyor.

First Modification

In FIG. 8 is depicted a modification of the apparatus illustrated in FIG. 1. The selector and diverting device 100 comprises a modified pantograph 102 supplemented by an auxiliary diverter guide 104 including flanges 106 and 108. The pantograph itself comprises fixed leg 110, reader member 112 including an upwardly directed slotted flange 114, and intermediate legs or links 116 and 118. As in the apparatus of FIG. 1, the intermediate links 116 and 118 are pivotally secured to fixed leg 110 at 105 and 109 and to reader member 112 at 103 and 107.

The leading end 120 of vertical flange 114 is directed at an obtuse angle away from conveyor 122 to present a diagonal flat surface to and act as a camming surface for the downwardly depending lead camming pin 124 on carrier 128. The outer end surfaces of links 116 and 118 are provided with concavities 150 and 152 to coact with pins 126 and 124 in a manner to be described. A plurality of code pins 130 are positioned in selected openings 132 to correspond with a particular selector apparatus 100 along the conveyor to divert the code bearing carrier onto a selected branch conveyor 134. Suitable side rails 123 and 125 maintain the carrier in alignment to assure proper cooperation with the selector device. Lead pin 124 is shorter in length (FIG. 9) than follower pin 126 and can pass over link 116 and the flat portion of reader leg 112 to contact the surface of bent flange 120. The lower end of follower pin 126 is below the lower end of leg 112 so as not to engage in concavity 152 in link 118 as it passes.

In operation, pin 124 depresses the reader member toward the fixed leg 110 and away from the conveyor 122 (FIG. 10) against the bias of spring 144. Spring 144 operates substantially like spring 64 in FIG. 2. Pin 124 then rides along the front surface of flange 114, past the narrow reading slots 140, to the far end 142 of flange 114 (FIG. 11). As pin 124 passes end 142, biasing spring 144 extends reading flange 114 into contact with the code pins for a short time interval since leg 112 is no longer held depressed. If the pins and reading slots do not match, lead pin 124 will pass by depressed link 118 (FIG. 11) with follower pin 126 simultaneously passing depressed link 116 and contacting the front edge of leg 112 to hold it depressed until the entire carrier has passed. This allows only one reading per carrier. It will be readily observed that the term "code," when used in the context of this invention, designates a plurality of pre-arranged means capable of matching or not matching a series of cooperative pre-arranged means on the "reader and selection bar." Accordingly, the "reading" function is a physical association between the bar and the code means, such that if the cooperative sets of means match each other, a "selection" can occur.

If a matching occurs between the several code pins 130 and the reading slots 140, biasing spring 144 will cause the reader member 112 to shift laterally toward the conveyor 122 and also longitudinally to cause the downwardly depending pins 130 to pass through slots 140. Simultaneously, the concave pockets 150 and 152 in links 116 and 118 engage fixed follower pin 126 and lead pin 124 respectively to cause an interlocking of the carrier with the reader-diverter member and form a motion transmitting joint therebetween. Energy is thus harnessed from the passing carrier to cause the selector member to shift longitudinally and also laterally. This places the selector in its extended position, depicted in phantom in FIG. 8. It in turn reacts upon the carrier to shift it laterally and diagonally across the conveyor. This causes fixed riding pins 154 and 156 (FIG. 12) to be trapped respectively behind flanges 108 and 106 respectively, and ride therealong. The sequential positions of these pins is depicted in phantom in FIG. 8. These flanges thus act as an auxiliary diverting lead-off or guide.

Referring to FIG. 12, the carriers used with the modified device are provided with removable lateral overhanging flanges 160 and 162 to support the lead pin, follower pin, and code pins on one side, and the riding pins 154 and 156 on the opposite side. These flanges may be attached to the carrier by suitable bolts 164 or the like.

It will be seen that the operation of the modified apparatus is substantially the same as the apparatus illustrated in FIG. 1, except that the motion transmitting joint and thus the main stresses occur between links 116 and 118 and fixed pins 126 and 124 instead of between the removable code pins and their reading slots. This allows the code pins to be quite small and therefore more numerous. It also allows heavier loads to be shifted.

The modified carrier or pallet is easier to fabricate since the riding pins 154 and 156 in combination with guide flanges 106 and 108 eliminate the necessity for diagonal slots in the bottom of the carrier. Of course, this arrangement may be used with the apparatus illustrated in FIG. 1 also. The geometry of the codes on the carriers may obviously be modified in many other ways too numerous to list here, without departing from the inventive concept. Further, the code carriers themselves may be of any desired type such as flat pallets, tote boxes, buckets, trays, simple message carriers, production articles placed on the conveyor and capable of receiving a code, or any other of many possible carrier structures. The term carrier is thus intended to include such varied forms of devices.

Second Modification

Figure 13:
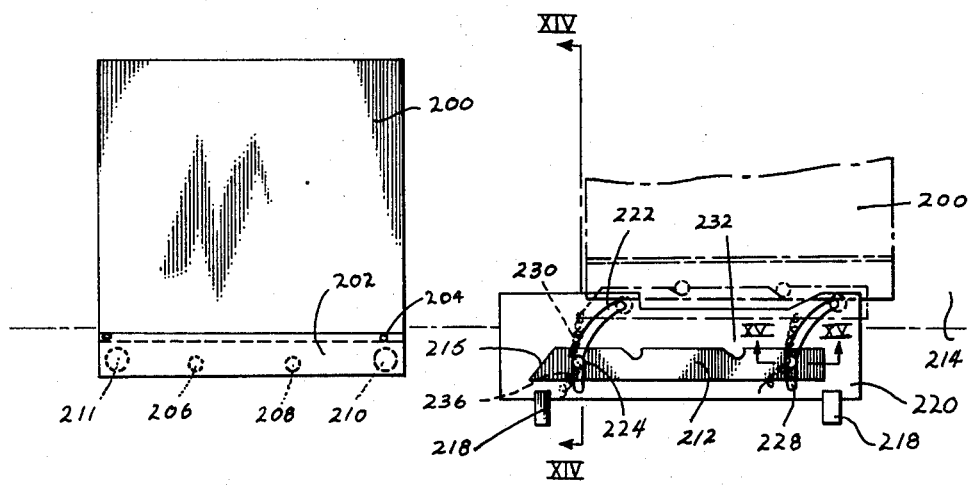
FIG. 13 is a plan view of a second modification of the inventive diverting device showing an initial position of the equipment in solid lines and the actuated position of the equipment in phantom.
Figure 14:
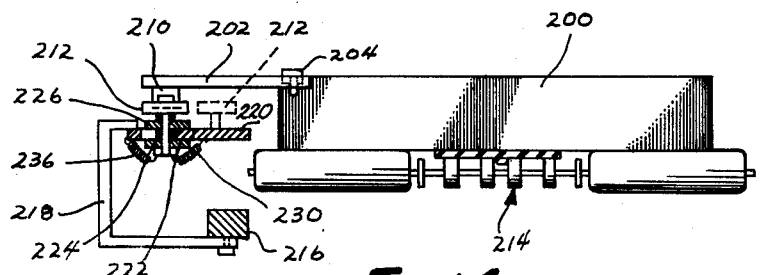
FIG. 14 is a sectional elevation view taken on plane XIV—XIV of FIG. 13.

Although in the preferred form of the invention the shifting selector member comprises one leg of a parallelogram linkage with the opposite leg affixed adjacent the conveyor, the selector member may also be movably mounted on different type supports to achieve the same general result. An example of such a modification is depicted in FIGS. 13–15. In this form of the invention, the reader member 212 is laterally and longitudinal shiftable on a fixed support 220 which is attached by brackets 218 to a stationary bracing member 216 of the conveyor 214. A plurality of reader slots 232 are provided in member 212 to associate with code pins 206 and 208. The code pins 206 and 208 are mounted under supporting flange 202 which is secured by bolts 204 to a passing carrier 200. The reader member 212 itself is movable in an outwardly swinging path, guided by the downwardly extending pins 224 projecting through the arcuate slots 222 of support 220 (FIG. 14). The reader member 212 is held in a spaced position above support 220 by suitable spacers 250 (FIG. 15), with washers 226 and 236 separated by spacer 248 providing a bearing surface on the support. A nut 225 secures each of the bolts 224.

In operation, as the carrier 200 approaches the selector member, downwardly extending lead pin 210 contacts surface 215 to depress the bar 212 to the outward end 228 of slots 222 against the bias of tension springs 230 which are connected between pins 224 and the front portion of fixed support 220. After pins 210 has traveled along the surface of the selector member and passed the end thereof, a reading operation takes place between slots 222 and the code pins on the carrier. If they do not match, the carrier continues along conveyor 214, with follower pin 211 then contacting surface 215 to again depress and hold the selector member 212 away from the code pins. This assures only one reading per carrier and prevents catching of individual code pins in the reading slots.

If the code pins match the slots, springs 30 pull bar 212 outwardly to cause it to interlock with the code pins. The carrier then imparts longitudinal movement to the selector which follows slots 222. The extended movement of the selector is against the bias of tension springs 236 connected between pins 224 and the outward portion of support 220. The extending or projecting selector in turn imparts lateral movement to the carrier as depicted in phantom in FIG. 13. As the carrier is laterally diverted, the code pins and the slots disengage and reader 212 springs back into its equilibrium position illustrated in solid lines in FIG. 13. An auxiliary diverting guide (not shown) may be provided opposite the selector-diverter device as needed.

The particular combination of pins and slots, or more generally projections and recesses, or their equivalent counterparts, may be varied greatly in their geometrical arrangement to suit the particular conveyor, carrier, and goods. Merely by changing the spacing of the respective pins and/or slots, the carrier may be made to pass several, or even several dozen selection and diverting devices before arriving at the particular one which will select and divert the carrier. Variable slot spacing may be obtained, for example, by sliding a suitable plate or guard over particular slots while allowing others to remain uncovered for association with a pre-set code of pins. The code pins may be varied by rearranging the pins to create different patterns. They may be merely raised or lowered into the operative position using suitable spring detents or the like. Not only may the position of the pins be varied, but the number may also be varied to produce a wide variety of codes. The pins may in certain instances be placed upon the selector member with the matching slots located in the side surface of the carrier.

It will be thus recognized that the illustrated structures presenting the inventive concept may be modified in countless ways depending upon the circumstances. Thus, the scope of this inventive concept is not to be limited to the illustrative material disclosed, but only by the scope of the appended claims and the reasonable equivalents thereto.

We claim:

1. A selection and diverting mechanism for a conveyor, said conveyor being adapted to transport coded article carriers, said mechanism comprising: a four-bar linkage having four legs arranged in a parallelogram; one leg of said linkage being fixedly mountable on said conveyor; the leg opposite and parallel to said affixable leg comprising a selector member; said member having blind slot code reading means associating with projecting pre-set codes on passing carriers and forming an interlock with a complementary code on a particular carrier to create a motion transmitting joint between said member and said particular carrier; said linkage being forcibly extensible toward said conveyor and carrier upon the formation of said joint with the passing carrier; said linkage constituting a shifting means upon being extended for shifting said particular carrier with respect to said conveyor; a cooperative lateral diverting means fixedly mountable with respect to said conveyor; follower means on said carrier cooperative with said cooperative diverting means when engaged therewith; said cooperative diverting means normally being out of the path of said follower means on passing carriers; said linkage when extended causing movement of said particular carrier sufficient for alignment of said cooperative diverting means and said follower means for interengagement thereof; and said interengagement causing lateral diverting movement of said particular carrier to the opposite side of the conveyor of said linkage.

2. A selection and diverting device for a conveyor transporting code-bearing carriers, comprising: a four-bar linkage having four legs arranged in a parallelogram; a first leg of said linkage being fixedly mountable adjacent to and longitudinally of said conveyor; a second leg of said linkage opposite and parallel to said leg comprising a selector member; a pair of intermediate parallel legs between said first and second legs, each being connected to both said first and second legs by pivotal connections to allow simultaneous lateral and longitudinal movement of said second leg with respect to said first leg; the ends of each of said intermediate pair of legs extending substantially beyond the pivotal connections between each of said pair of legs and said selector member; a recess in each of said extended ends; a pair of projections on each carrier cooperative with said recesses to interlock therewith when engaged; code reading means on said selector member associating with pre-set code messages on passing carriers and selecting a particular carrier bearing a matching code; said selector member being shifted with said selection to engage and interlock said projections and recesses, thereby causing said selector member and said pair of legs to move under the force of the passing carrier; said recessed ends forming a motion transmitting joint with said projections upon said movement to transmit motion from said particular carrier to said linkage; said moving linkage being extended further by said particular carrier to in turn react upon said particular carrier to shift it laterally on said conveyor.

References Cited in the file of this patent

UNITED STATES PATENTS

| | | |
|---|---|---|
| 1,503,936 | Benoit | Aug. 5, 1924 |
| 1,804,154 | Cowley et al. | May 5, 1931 |
| 2,253,572 | Mitchell | Aug. 26, 1941 |
| 2,931,484 | Muller et al. | Apr. 5, 1960 |